Jan. 11, 1938. F. M. GUY 2,105,188
CLUTCH
Filed June 26, 1936
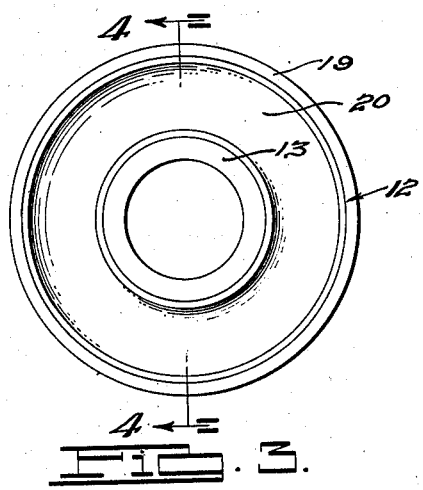
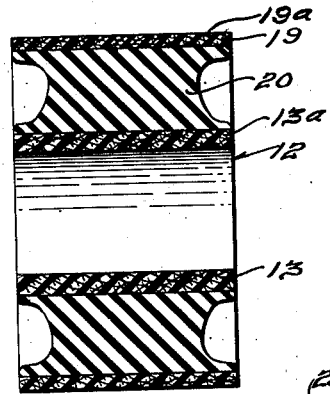
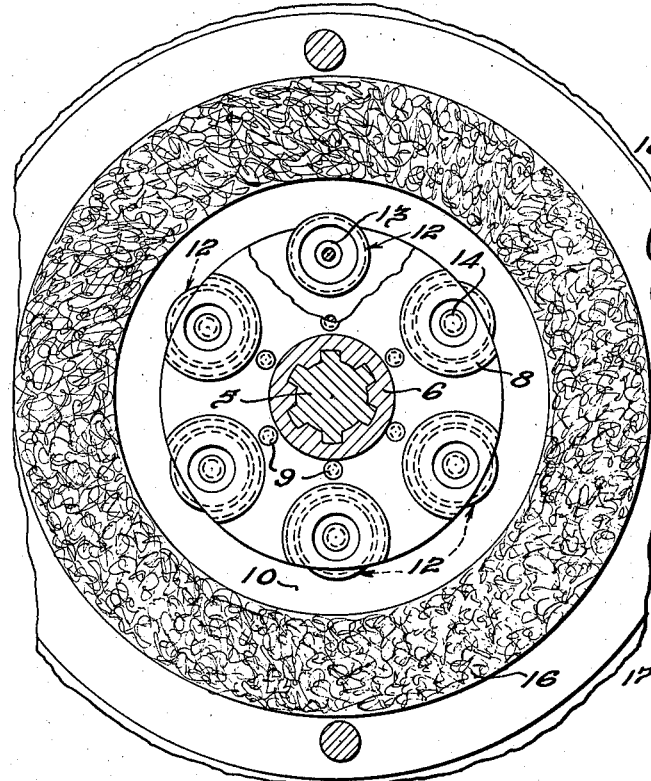
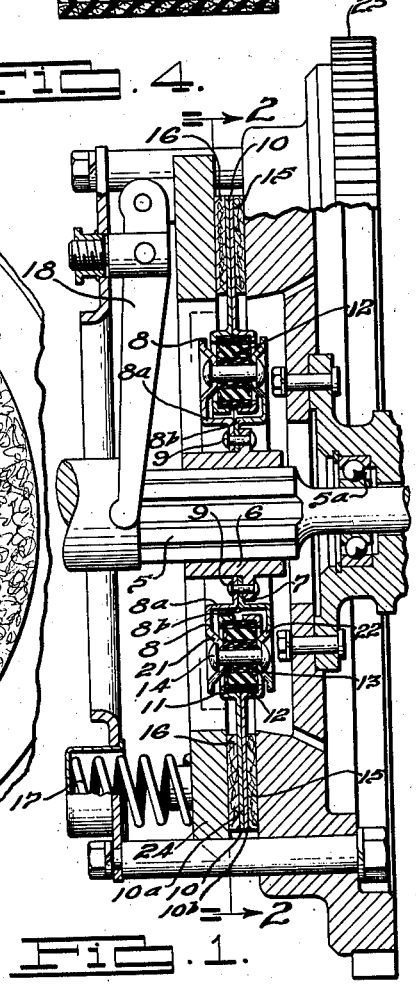
INVENTOR
Frederick M. Guy.
BY Dike, Calver and Gray
ATTORNEYS.

Patented Jan. 11, 1938

2,105,188

UNITED STATES PATENT OFFICE 2,105,188

CLUTCH

Frederick M. Guy, Detroit, Mich., assignor to Guy and Murton, Incorporated, Detroit, Mich., a corporation of Michigan Application June 26, 1936, Serial No. 87,430

4 Claims. (Cl. 192—68)

The present invention relates to improvements in a clutch and particularly to improvements in a flexible driven plate for use in a clutch of the dry plate type.

In designing the modern automobile for the purpose of increasing its acceleration and speed, much weight has been eliminated from the engine flywheel. This has resulted in the imposition of extra strains on the clutch due to the failure of the lighter flywheel to absorb the power thrusts of the motor. These unabsorbed power thrusts impose severe intermittent strains on the clutch with the result that the clutch soon becomes noisy and wears rapidly. The noise generated in the clutch has been termed the "clutch rattle" and is, as a general rule, due to failure of the flywheel to properly absorb the power thrusts from the motor. This "clutch rattle" is not only very disagreeable to hear, but is also the cause of excessive vibration in the clutch and of the resulting excessive wear on the various parts of the clutch.

It is, therefore, an object of the present invention to provide a clutch which is sufficiently flexible to absorb the transmitted power thrusts of the engine without impairing the operation of the clutch.

It is a further object of the invention to provide a clutch which not only will cushion the torque thrusts incident to the operation of the clutch without impairing its operation, but also will cushion the shocks resulting from relative endwise movement of the parts of the clutch.

Other objects and advantages of this invention will appear in the following description and appended claims, reference being had to the accompanying drawing forming a part of this specification wherein a preferred embodiment of the invention is illustrated.

In the drawing, wherein like reference characters designate corresponding parts in the several views, Fig. 1 is a side elevation in partial longitudinal section of a clutch embodying the present invention;

Fig. 2 is a fragmentary plan view taken on the line 2—2 of Fig. 1;

Fig. 3 is a plan view of one of the resilient elements used in the construction of my clutch; and Fig. 4 is a cross-sectional view in side elevation of one of the resilient members taken on the line 4—4 of Fig. 3.

Before explaining in detail the present invention it is to be understood that the invention is not limited in its application to the details of construction and arrangement of parts illustrated in the accompanying drawing, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring more in detail to the drawing, Fig. 1 shows a clutch of the dry plate type, which serves to transmit power to a splined shaft 5, through a splined hub 6, which in my construction is provided with the annular shoulder 7. The splined shaft 5 is journaled in a bearing 5a carried by the flywheel 23. Fastened to the hub 6 are a plurality of annular webs 8, secured to the shoulder 7 by means of rivets or similar means 9, and provided near their peripheries with the depressed circular portions or pockets as shown in Fig. 1. The outer portion of the clutch plate 10 is formed of metal stampings 10a and 10b which are circular in shape and formed with a plurality of pockets 11. Placed in the pockets 11 are a plurality of resilient elements 12. The resilient elements 12 are provided with a perforated core 13, through which a rivet or similar means 14 is placed for holding the clutch plate 10 in driving relation to the hub 6.

A clutch facing 15 is carried by the flywheel 23, and a clutch facing 16 is carried by the pressure plate 24. These clutch facings 15 and 16 are of any well-known type and grip the clutch plate 10 when held in contact with it by means of springs 17 acting on the pressure plate 24. Clutch operating levers of the type shown at 18 are provided for operating the clutch.

The other parts of the clutch are standard parts and are well known to those skilled in the art.

As shown in Fig. 2, the resilient members 12 are annular in shape and have a circular opening through the inner core 13. This view also shows the location of the said resilient members in the clutch for holding the clutch plate 10 in yielding connection with the splined hub 6.

As shown in Figs. 3 and 4, and as further described in my United States Letters Patent No. 1,978,940, dated October 30, 1934, on a resilient block, the resilient elements 12 may be formed with an outer shell 19 and an inner core 13. Between the shell 19 and the core 13 some resilient material 20, such as rubber or the like, is fixed in order to provide relative yielding movement between the said shell 19 and the said core 13.

The core 13 and the shell 19 are preferably reenforced in some suitable manner, as for example by a plurality of porous layers 13a and 19a of wire mesh, fabric, or other suitable materials, to which a body of rubber is secured as by vulcanizing or bonding. This construction provides a large area for the physical contact between the reenforcing material and the rubber. Due to the flow of the rubber between the openings in the porous reenforcing materials, the rubber and the reenforcing materials are securely locked together.

As shown in Fig. 1, the pocket portions 11 of the parts 10a and 10b of the clutch plate 10 are cut away so that only the outer shells 19 of the resilient elements 12 are engaged by the faces of the clutch plate pockets. The webs 8, attached to the hub 6, are built up of two stampings 8a and 8b, with bosses 21 and 22 pressed from their faces, the said bosses 21 and 22 being so formed as to engage the perforated core 13 of the resilient blocks 12 carried in the pockets 11 of the clutch plate 10. An opening is provided in the bosses 21 and 22 on the webs 8 for inserting a rivet or similar means 14 to complete the connection between the web members 8 and the clutch plate 10. By this construction of the plate 10 and the webs 8, I am able to secure positive yielding connection between the hub 6 and the plate 10 without a metallic contact between the parts. This allows yielding movement between the hub 6 and the outer clutch plate 10 whenever the outer clutch plate 10 is subjected to a torque strain or to any movement in an endwise direction relative to the said hub 6.

The operation of my clutch is as follows:

When the clutch levers 18 are released so that the clutch facing 16 is spring pressed against the plate 10, the plate 10 is pushed against the facing 15 on the flywheel 23. When thus held, the plate 10 is caused to rotate with the flywheel 23, and this motion is transmitted through the resilient members 12 and the webs 8 to the hub 6 and the splined shaft 5. When the clutch levers 18 are so actuated that the clutch facing 16 is not held firmly against the clutch plate 10, the clutch plate 10 tends to move away from the facing 15 and to move independently of the flywheel 23, so as not to transmit driving power to the shaft 5.

When the clutch plate 10 is engaged by the clutch facings 15 and 16, the initial shock of the engagement is transmitted to the resilient members 12, and is cushioned by the said resilient members so that the full force of the initial starting shock is not transmitted to the splined hub 6 and the splined shaft 5.

This cushioning of the shocks incident to the engagement of the clutch plate 10 by the clutch disk facings 15 and 16 results in a quiet operation of the clutch in that the shocks are not transmitted to the splines of the splined hub 6 and the splined shaft 5 causing rattle between those parts. In addition, the power impulses which are not absorbed by the flywheel and which are transmitted to the clutch are absorbed to a very large extent by the resilient members 12, which results in doing away with much of the so-called "clutch rattle."

I claim:

1. In a clutch interposed between a driving shaft and a driven shaft, a flywheel carried by the driving shaft, a splined hub on the driven shaft, a pressure plate attached to said flywheel, a friction disk attached to said splined hub and extending between said flywheel and said pressure plate, said friction disk comprising an outer ring and an inner hub, said outer ring being composed of a plurality of metal stampings having formed therein a plurality of recesses, and said inner hub portion being attached to said splined hub and comprising a plurality of metal stampings having peripheral pockets corresponding in number to the number of said recesses in said outer ring, a plurality of resilient members held in said recesses, and adapted for engagement with said peripheral pockets on said inner hub whereby said outer ring and said inner hub are yieldingly held together, friction linings carried by said flywheel and said pressure plate on the faces adjacent said friction disk, means for yieldingly holding said pressure plate in intimate contact with said friction disk, and means for releasing said pressure plate from said intimate contact with said friction disk.

2. A friction disk for clutches, comprising an outer ring having a plurality of pockets formed therein, an inner hub having a plurality of web members extending outwardly therefrom and having peripheral recesses corresponding in number and location to said pockets, resilient blocks carried in said pockets, each of said resilient blocks comprising an inner core and an outer shell having resilient material bonded therebetween, said inner core and said outer shell extending beyond the resilient material whereby said core and said shell may be firmly held without affecting the resiliency of said resilient material, means for rigidly attaching said web members to said inner cores without contact with said resilient material, and means for attaching said hub to a shaft to be driven.

3. A clutch friction plate, comprising a plurality of metal stampings having pockets formed therein, a plurality of web members attached to a hub and projecting toward said pockets, resilient blocks carried in said pockets, said resilient blocks comprising a shell and a core and rubber bonded therebetween, and means for rigidly attaching said web members to the cores of said resilient blocks, whereby movement of the connected members is permitted by the resilient flow of the rubber bonded between said cores and said shells.

4. A clutch friction plate, comprising a plurality of metal stampings having pockets formed therein, a plurality of web members attached to a hub and projecting toward said pockets, resilient blocks carried in said pockets, said resilient blocks comprising a shell and a core and rubber bonded therebetween, said shell and said core having edges extending beyond the surface of said rubber, whereby said resilient blocks may be rigidly held in place without impairing the resilient flow of said rubber, and means for attaching said web members to said cores.

FREDERICK M. GUY.